United States Patent [19]

Shimada

[11] 4,412,258
[45] Oct. 25, 1983

[54] MAGNETIC RECORDING AND PLAYBACK APPARATUS

[75] Inventor: Shojiro Shimada, Tokyo, Japan

[73] Assignee: Sony Corporation, Tokyo, Japan

[21] Appl. No.: 231,052

[22] Filed: Feb. 3, 1981

[30] Foreign Application Priority Data

Feb. 6, 1980 [JP] Japan .................................. 55-13244

[51] Int. Cl.$^3$ ...................... G11B 15/12; G11B 15/04; G11B 27/36
[52] U.S. Cl. ........................................ 360/62; 360/31; 360/61
[58] Field of Search ...................... 360/61, 62, 31, 137

[56] References Cited

U.S. PATENT DOCUMENTS 3,347,996 10/1967 Uchikoshi .............................. 360/62
4,203,139 5/1980 Horiuchi ................................ 360/62

Primary Examiner—Vincent P. Canney
Attorney, Agent, or Firm—Lewis H. Eslinger; Alvin Sinderbrand

[57] ABSTRACT

A magnetic tape recording and playback apparatus, selectively changeable between recording, playback, and stop modes, includes a recording/playback transducer, a line amplifier connected during recording to amplify the signal to be recorded by the transducer and during playback to amplify the signal picked up by the transducer; a power amplifier to amplify the signal provided by the line amplifier to drive an acoustic transducer; and a level indicator for selectively indicating the output level of the line amplifier and of the power amplifier. A switch circuit automatically connects the level indicator to the line amplifier when the recording mode is selected and to the power amplifier when either the playback or stop mode is selected. When the apparatus is in the playback mode, the level indicator can be coupled to the line amplifier by actuation of a push button or other manual switch. In one possible embodiment, the switching circuit includes a flip-flop circuit; in another embodiment, the switching circuit includes a solenoid-type plunger switch.

14 Claims, 3 Drawing Figures

MAGNETIC RECORDING AND PLAYBACK APPARATUS

BACKGROUND OF THE INVENTION

1. Field of the Invention

The present invention relates generally to magnetic recording and playback apparatus, and more particularly relates to such apparatus in which a level indicator is selectively connected to any of various amplification stages to indicate a corresponding signal level.

2. Description of the Prior Art

There are many conventional stereo or high fidelity audio systems in which a tape recorder and an amplifier are combined as a unit with other components, such as a record player, an AM/FM tuner, or the like.

Such a stereo or other high fidelity system generally includes a source selector disposed on the front panel of the unit for selectively connecting one of the tape recorder, record player, and tuner to the amplifier to provide thereto an audio signal. Normally, there is also included on the front panel a VU meter or other signal level indicator, which can be, for example, a moving-needle type meter or a bar-graph LED display.

The VU meter is normally connected to measure the output level of the power amplifier used to drive speakers or head phones. However, when a tape recording mode is selected, the VU meter is switched to a line amplifier connected with the recording head of the tape recorder, so that the VU meter displays the signal level of the signal being recorded. In a tape playback mode, the VU meter is connected to the power amplifier, rather than to the line amplifier. Therefore, in the playback mode, it is not possible to ascertain, by viewing the VU meter, whether the signal being picked up from magnetic tape is being provided at an appropriate level. Thus, it is not possible to determine whether the line amplifier requires adjustment to achieve an optimum signal, or whether the signal has been previously magnetically recorded at an optimum level.

In order to overcome the above difficulty, several configurations have been previously proposed.

According to one previously-proposed configuration, a manually operated change-over switch is provided on the front panel of the unit for selecting one or the other of the power amplifier and the line amplifier to be coupled to the VU meter. Such an arrangement does have the advantage of making it possible to indicate the recording signal level when the recording mode is selected, and also to indicate the level of recorded signal on the magnetic tape when the playback mode of the tape recorder is selected. However, the manual operation required for the change-over switch tends to induce operator errors. More particularly, an operator may believe that the output of the power amplifier is being indicated on the VU meter, when, instead, the output of the line amplifier is actually being indicated. As a result, the operator may unintentionally misadjust the setting of either the line amplifier or the power amplifier, because of his misperception of what the VU meter indicates.

Another proposed arrangement to avoid the above-mentioned difficulties involves arranging the change-over switch to be operated in conjunction with a source selector switch coupled to the power amplifier and having a source contact and a tape play contact. When the source selector switch is actuated to its source contact, a source signal, such as the output of the record player or tuner, is furnished to the power amplifier, and the output signal level of the power amplifier is furnished to the VU meter to show the volume of the output signal. When the select switch is actuated to its tape play contact, the playback signal from the tape recorder is furnished through the select switch to the power amplifier, while the output signal level of the line amplifier is furnished to the VU meter. While this arrangement tends to eliminate the problem of operator error, it is impossible with this arrangement for the VU meter to indicate the volume of the output signal from the power amplifier when a tape playback mode has been selected.

It should be remarked that in the conventional or prior art stereo or high fidelity system, the VU meter does not show a significant response when the sound volume is extremely low. For example, if the VU meter is a moving-needle meter, changes in level will not produce noticeable swing of the meter needle. Also, when a bar-graph meter, or other linear arrangement of light emitting diodes is used, the light emitting states of the light emitting diodes will not vary enough to indicate changes in level when the volume is extremely low, so that the optical effect of the bar-graph representation is considerably degraded. This drawback makes it difficult for a retail shop to provide a satisfactory display of equipment performance of a tape machine when in its playback mode, if the sound volume is turned down to a low level.

OBJECTS AND SUMMARY OF THE INVENTION

It is an object of the present invention to provide magnetic recording and playback apparatus wherein the output level of a power amplifier is indicated on an indicating device during the playback mode, and the output level of a line amplifier is indicated during the recording mode, but in which the level of the recorded signal picked up from the tape can be selectively indicated during the playback mode, so that it can be determined whether such signal has been previously recorded at an optimum level.

Another object of this invention is to provide magnetic recording and playback apparatus in which the indicator device is positively switched back to the output of the power amplifier when a stop mode is selected, thereby minimizing the possibility of operator error.

A further object of the present invention is to provide magnetic recording and playback apparatus in which the indicator device measures the output level of the line amplifier during the playback mode, thereby assuring that there will be significant needle movement, in the case of a moving-needle meter, or significant change of lighting, in the case of a bar-graph display, even though the volume of the reproduced sound is turned extremely low.

According to an aspect of this invention, a magnetic recording and playback apparatus that is selectively changeable between recording, playback, and stop modes comprises a recording/playback transducer, a line amplifier connected during recording to amplify a signal to be recorded by the transducer and during playbck to amplify the signal picked up by the transducer; a power amplifier to amplify the signal provided from the line amplifier to drive an acoustic transducer; a level indicator for selectively indicating the output level of the line amplifier and of the power amplifier;

and a switching circuit for selectively coupling the level indicator to the line amplifier and to the power amplifier. The switching circuit is adapted to automatically connect the level indicator to the line amplifier when the recording mode is selected and to the power amplifier when either the playback or stop mode is selected. When the apparatus is in its playback mode, the level indicator can be coupled to the line amplifier, rather than to the power amplifier, by actuation of a push button or other manual switch.

In one possible embodiment of the invention, the switching circuit includes a flip flop circuit; in another embodiment, the switching circuit includes a solenoid-type plunger switch.

Various other features and advantages of this invention will be apparent from the ensuing description, when considered with the accompanying drawings.

DETAILED DESCRIPTION OF THE PREFERRED EMBODIMENTS

Figure 1:
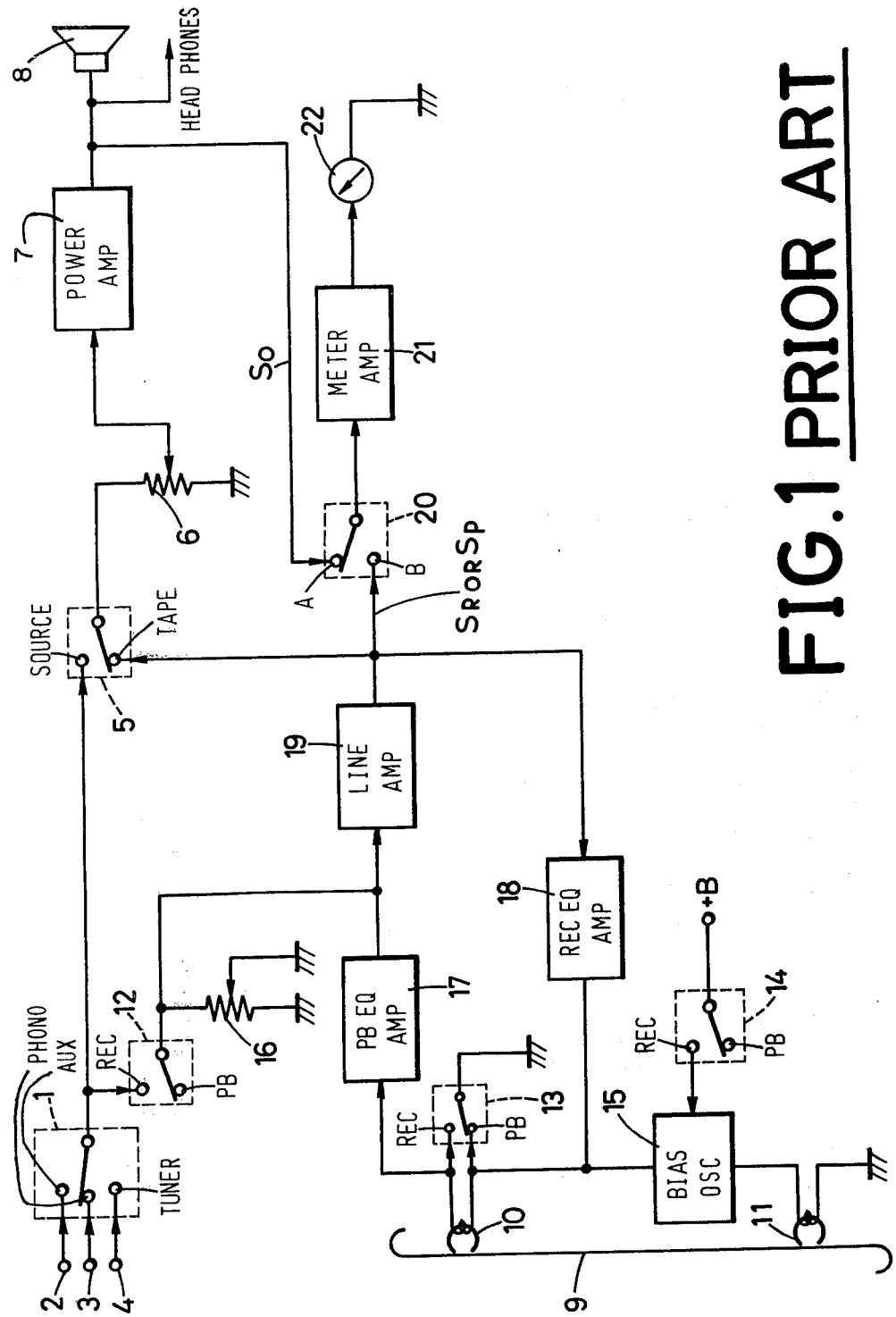
FIG. 1 is a circuit diagram of a conventional tape recording and playback system.

FIG. 1 illustrates a conventional tape recording and playback apparatus of the type mentioned above, and which is afflicted with the difficulties and defects as set forth hereinabove. A description of this conventional apparatus will serve to distinguish more clearly the features and advantages of the magnetic recording and playback apparatus according to this invention from those in existing apparatus.

In the conventional apparatus shown in FIG. 1, and in the embodiments of this invention which follow thereafter, similar elements and parts are identified with the same reference characters, and a detailed description thereof will be provided only when such elements and parts are first introduced.

As shown in FIG. 1, the conventional apparatus includes an input selector switch 1 which is switchable between contacts AUX, PHONO, and TUNER, here connected to an auxiliary input 2, a phono input 3, and a tuner input 4, respectively. A source/tape selector switch 5 has a source contact SOURCE coupled to the input selector switch 1, and a tape contact TAPE coupled to receive signals $S_R$ to be recorded when the apparatus is in a record mode and signals $S_P$ picked up from tape when the apparatus is in a playback mode. The selected signal is then provided from the switch 5 through a variable resistor volume control 6 to a power amplifier 7, whose output signal $S_O$ is used to drive an output transducer 8, such as a speaker or headphone.

When the apparatus is in either its record or playback mode, a magnetic tape 9 is moved past a recording-/pickup head 10 and also past an erase head 11. Recording/playback switches 12, 13, and 14, which are ganged together, are selectively actuated between respective recording contacts REC and playback contacts PB, when the recording and playback modes are selected, respectively.

The contact REC of the switch 14 is coupled to a bias oscillator 15, so that a voltage $+B$ is furnished to the oscillator 15 when the recording mode is selected, and the bias oscillator 15 provides an erase signal to the erase head 11.

The contact REC of the switch 12 is connected to the input selector switch 1, and the movable contact of the switch 12 is then coupled to a variable resistor 16 for adjusting the recorded signal level.

The switch 13 is coupled to the recording/pickup head 10 so that the latter provides a picked-up signal to a signal playback equalizing amplifier 17 during the playback mode, and records the signal provided from a recording equalizing amplifier 18 during the recorded mode.

A line amplifier 19 has an input coupled to the output of the playback equalizing amplifier 17 and also to the movable contact of the switch 12. The output of the line amplifier 19 is coupled to the recording equalizing amplifier 18 and also to the contact TAPE of the selecting switch 5. Thus, the line amplifier 19 is connected so that during recording, the latter provides the signal $S_R$ to be recorded to the equalizing amplifier 18, and, during playback, provides the signal $S_P$ picked up from the tape through the switch 5 and the volume control resistor 6 to the power amplifier 7.

The apparatus of FIG. 1 finally includes a level indicating arrangement formed of a meter switch 20, a meter amplifier 21, and a level indicator 22, which can be, for example, either a moving-needle type meter or a bar-graph LED device. The switch 20 has first and second fixed contacts A and B respectively coupled to the outputs of the power amplifier 7 and the line amplifier 19. It should be remarked that the fixed contact B is, as a practical matter, coupled to the input of the power amplifier 7 when the switch 5 is actuated to contact TAPE.

Generally, in this conventional arrangement, the switch 20 is actuated to the contact B only when the apparatus is in the recording mode, and is actuated to the contact A at all other times. Thus, the level indicator 22 indicates the level of the output of the line amplifier 19 only during recording, so that during playback, the level indicator 22 only indicates the strength of the output signal from the power amplifier 7.

If the switch 20 is arranged to be manually operated, then the level of the signal from the line amplifier 19 can be measured by manually actuating the switch 20 to the contact B during playback. However, such manual operation of the switch 20 tends to lead to operator errors, such as a misperception that, for example, the indicator 22 is indicating the level of the output of the power amplifier 7, when, instead, it is actually indicating the level of the output of the line amplifier 19.

If the switch 20 is ganged with the switch 5 so as to be operated in association therewith, it is possible to avoid such operator errors. The recording level and the recorded signal level will be measured by the level indicator 22 during both the recording and playback operations, because in both the recording and playback modes, the switch 20 will be actuated to its contact B. However, in such arrangement, it is not possible for the level indicator 22 to measure and indicate the sound volume corresponding to the level of the output $S_O$ of the power amplifier 7, because the switch 20 cannot be actuated to its contact A during a playback operation.

Figure 2:
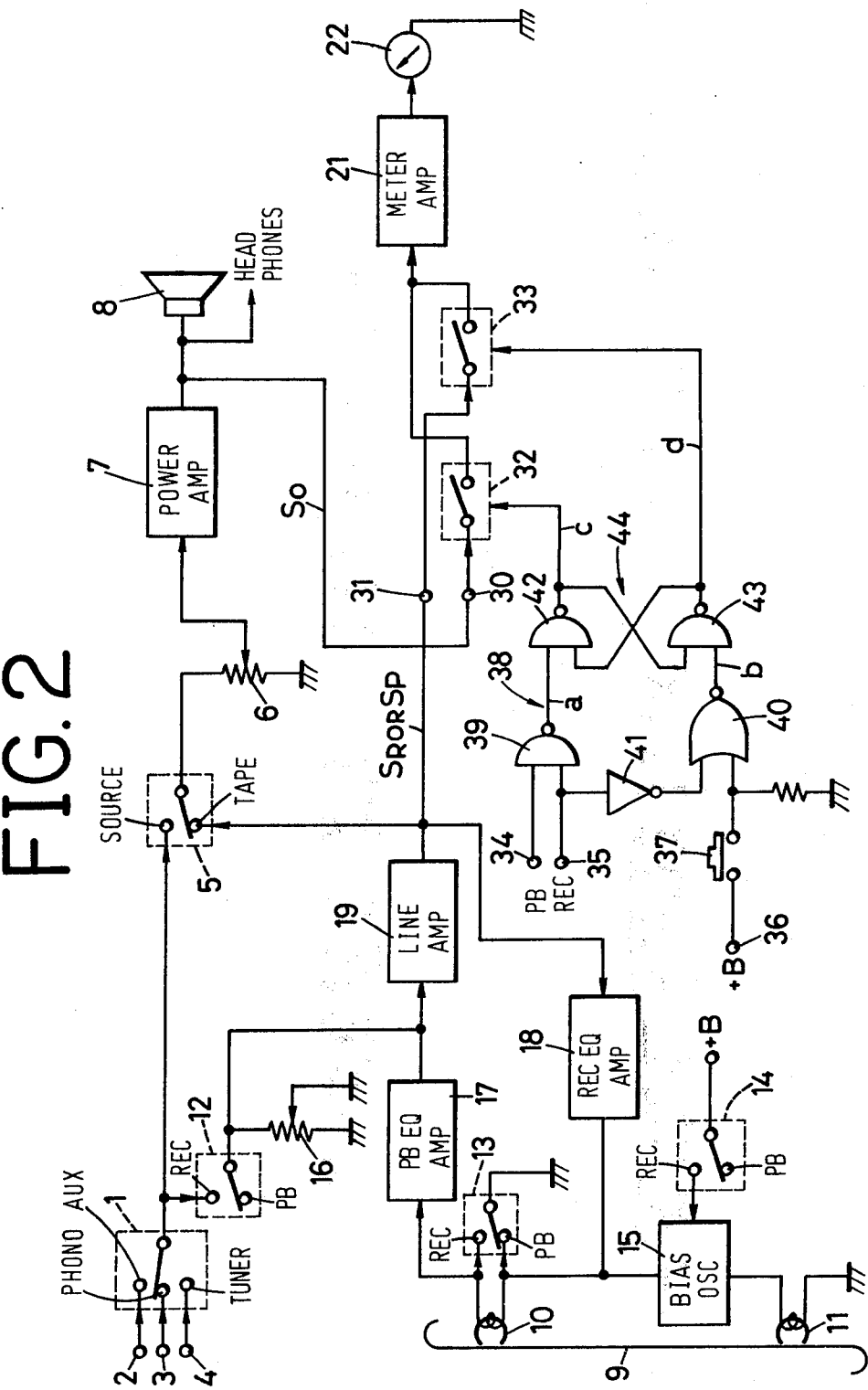
FIG. 2 is a circuit diagram of a first embodiment of the tape recording and playback apparatus according to this invention.
Figure 3:
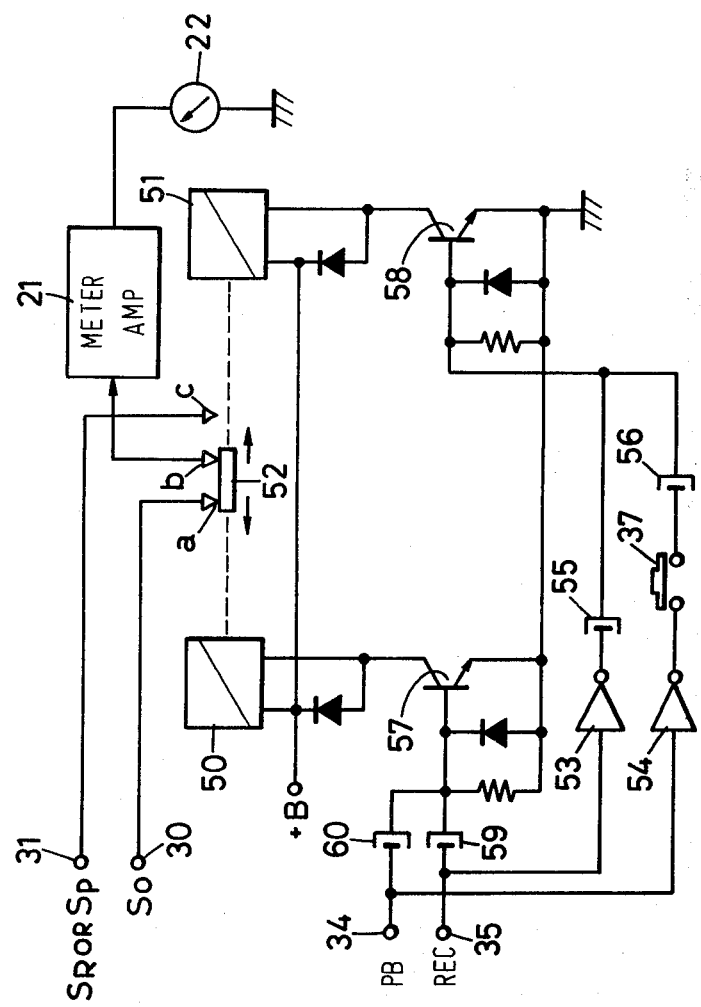
FIG. 3 is a circuit diagram illustrating another embodiment of the apparatus according to this invention.

In contrast to the foregoing, the below described embodiments of this invention, as particularly depicted in FIGS. 2 and 3, provide a simple and straightforward arrangement to avoid the aforementioned problems of the conventional apparatus as shown in FIG. 1.

The overall arrangement of the embodiment of FIG. 2 is similar to that of the apparatus shown in FIG. 1, except that the switch 20 of FIG. 1 is replaced with the switch arrangement and the control arrangement as described below. The output of the power amplifier 7 and the line amplifier 19 are respectively coupled through input terminals 30 and 31 to first and second switches 32 and 33. The first switch 32 is closed when a playback or stop mode is selected, to connect the output of the amplifier 7 to the meter amplifier 21. The second switch 33 is closed when a recording mode is selected to connect the output of the line amplifier 19 to the meter amplifier 21.

Thus, during recording, the signal $S_R$ is provided from the line amplifier 19 through the switch 33 and the level thereof is indicated on the level indicator 22. During playback, the output signal $S_O$ from the power amplifier 7 is provided through switch 32, and the level thereof is indicated on the level indicator 22. However, during playback, the switch 32 can be selectively opened and the switch 33 correspondingly closed, so that the picked-up signal $S_P$ from the line amplifier 19 is provided to the meter amplifier 21 and thence to the level indicator 22.

In order to assure that the switches 32 and 33 are actuated properly, a switching control circuit is provided constructed as follows. Input terminals 34 and 35 are provided with playback and recording signals PB and REC, respectively. The signal PB is "0" (low level) only when the playback mode is selected, and is "1" (high level) otherwise. Correspondingly, the signal REC is "0" when the recording mode is selected, and is "1" otherwise.

Another terminal 36 of the switching control circuit is provided with a DC voltage +B. The terminal 36 is connected to a manually actuated switch 37, such as a push-button. The input terminals 34 and 35, and the switch 37 are connected to a switch control circuit 38, which includes a NAND gate 39 having inputs thereof respectively connected to the input terminals 34 and 35, a NOR gate 40 having an input thereof connected to the switch 37, and another input coupled by an inverter 41 to the input terminal 35. The NAND gate 39 provides a signal a to one input of a second NAND gate 42, while the NOR gate 40 provides a signal b to an input of a third NAND gate 43. The NAND gates 42 and 43 provide respective output signals c and d to inputs of each other.

It should be recognized that the NAND gates 42 and 43 so configured form a familiar RS type flip-flop 44. The signals a and b thus are the reset and set signals for the flip-flop 44, while the output signals c and d are the non-inverted and inverted outputs thereof, respectively. The signal c is provided to close the switch 32, while the signal d is provided to close the switch 33.

The switches 32 and 33 may be formed, for example, as analog-type switches formed of a field effect transistor (FET). Thus, the switch 32 will close when the signal c is "1", while the switch 33 will close when the signal d is "1".

The apparatus of FIG. 2 operates as follows. When the tape apparatus of the stereo or high fidelity system is in its stop mode, the control signals PB and REC applied to terminals 34 and 35 are each "1", with the result that the output signal a from NAND gate 39 is "0". Consequently, the output c of the NAND gate 42 is "1". At the same time, the inputs to the NOR gate 40 are each "0" so that the output signal b thereof is "1". As a result, the output d of the NAND gate 43 is "0". Thus, in the stop mode, the switch 33 is open and the switch 32 is closed so that the output signal $S_O$ from the power amplifier 7 is furnished to the meter amplifier 21 and thence to the level indicator 22.

When the mode of the tape apparatus is changed from the stop mode to the playback mode, the level of the control signal PB becomes "0" while the level of the control signal REC remains "1". As a result, the signal a becomes "1", while the values of the signals b, c, and d, remain unchanged. Thus, the level of the signal $S_O$, which in this case, is the signal obtained from the power amplifier 7 by amplifying the recorded signal picked up by the head 10, is indicated on the level indicator 22.

Thereafter, while the tape recorder remains in the playback mode, if the switch 37 is actuated manually, one of the inputs to the NOR gate 40 becomes "1", so that the value of the output signal b thereof becomes "0", and, as a result, the value of the output signal d becomes "1", thereby closing the switch 33. At the same time, the value of the output signal c becomes "0", thereby opening the switch 32. Thus, after actuation of the switch 37, the level of the signal $S_P$, which is the played back signal at the output of the line amplifier 19, is indicated on the level indicator 22. Because the indicated signal $S_P$ is taken at the input of the volume control resistor 6 and the power amplifier 7, the reading on the level indicator 22 gives an accurate measure of the actual level of the signal recorded on the tape 9. This feature permits a user to determine whether the recorded signal has been recorded at an appropriate level. Also, because the level of the output signal from the line amplifier 19 does not depend on the setting of the volume control resistor 6, the gain of the meter amplifier 21 and the sensitivity of the level indicator 22 can be selected to be large enough to observe variations in the level of the signal $S_P$ even when the output volume from the output transducer 8 is turned down to an extremely low level. Consequently, the fluctuations in the signal $S_P$ will provide noticeable movement of the needle in the case of a moving-needle indicator, or in variation in bar-graph representation in the case of a bar-graph LED display.

When the mode of the tape recorder is changed from the playback mode back to the stop mode, regardless whether the switch 37 has been actuated, the signals a, b, c, and d take on the values "0", "1", "1", and "0" as mentioned above, so that the level indicator 22 once again indicates the level of the output signal $S_O$. In this case, the signal $S_O$ represents the amplified signal from a signal source other than the tape recorder.

When the mode of the tape recorder is changed from the playback mode to the recording mode, the control signals PB and REC take on the values "1" and "0", respectively, so that the value of the signal a becomes "1", and the output of the inverter 41 also becomes "1", thereby bringing the value of the output signal b to "0". It should be remarked that this result occurs whether or not the switch 37 had been actuated. Thus, when the recording mode is selected, the output signals c and d from the NAND gates 42 and 43 become "0" and "1", respectively, so that the level indicator 22 is operative to measure the level of the signal $S_R$ to be recorded on the tape 9. When the recording mode has been selected, actuation of the switch 37 has no effect upon the state of the flip-flop 44, and therefore, does not affect the switches 32 and 33.

The values of the signals a through d for the various modes can be summarized in the following table:

TABLE

| MODE | a | b | c | d |
|---|---|---|---|---|
| STOP | 0 | 1 | 1 | 0 |
| PLAYBACK | 1 | 1 | 1 | 0 |
| PLAYBACK (Switch 37 actuated) | 1 | 0 | 0 | 1 |
| RECORDING | 1 | 0 | 0 | 1 |

Another embodiment of the switch control circuit of this invention is illustrated in FIG. 3. In this view, the illustration of the elements in advance of the terminals 30 and 31 has been omitted for reasons of simplicity.

Here the switching circuit is formed as an electromagnetic plunger switch formed of first and second solenoids 50 and 51, and a slide switch 52 having a contact a coupled to the terminal 30 to receive the output signal $S_O$ from the amplifier 7, a contact b coupled to the meter amplifier 21, and a contact c coupled to the terminal 31 to receive the signal $S_R$ or $S_P$ from the line amplifier 19. A DC voltage +B is supplied to one end of each of the solenoids 50 and 51.

Also in this embodiment, the control signals REC and PB are furnished from the input terminals 35 and 34 to respective inverters 53 and 54 and thence to differentiator capacitors 55 and 56. Here the manually actuated switch 37 is disposed between the inverter 54 and the differentiator capacitor 56.

Switching transistors 57 and 58 are connected with their respective collectors coupled to the first and second solenoids 50 and 51, and with their emitters connected to ground. The base of the switching transistor 57 is coupled through differentiator capacitors 59 and 60 to receive differentiated versions of the control signals REC and PB. The base of the switching transistor 58 is connected to receive the differentiated signals from the differentiator capacitors 55 and 56.

In this embodiment, when the tape apparatus is set into its stop mode, the control signals PB and REC are each "1". As a result, a pulse signal is applied to the base of the transistor 57, thereby energizing the solenoid 50 to draw the slide switch 52 into position to bridge the contacts a and b. At the same time, the outputs of the inverters 53 and 54 are each "0", so that the transistor 58 remains off.

Thus, when a stop mode is selected, the meter amplifier 21 and level indicator 22 are operative to measure the level of the output signal $S_O$ fom the amplifier 7.

When the mode is changed from the stop mode to the playback mode, the signal REC remains "1" but the signal PB drops to "0". Thus, at this time, neither the solenoid 50 nor the solenoid 51 is actuated, and the slide switch 52 remains in position to connect the contacts a and b. However, the output of the inverter 54 rises to "1". Thus, if the switch 37 is manually actuated, a "1" is applied to the differentiator capacitor 56, and the latter applies a pulse signal to the base of the switching transistor 58. At that time the latter is operative to energize the second solenoid 51, thereby moving the slide switch 52 into position to bridge the contacts b and c. Thus, when the switch 37 is actuated while the apparatus is in its playback mode, the level indicator 22 is operative to measure the level of the signal $S_p$ from the line amplifier 19.

If the mode is changed from the stop mode to the recording mode, the level of the control signal PB remains "1" while the level of the control signal REC drops to "0". This raises the level of the output of the inverter 53 to "1", and a differentiated pulse is applied from the differentiator capacitor 55 to the base of the switching transistor 58. This energizes the second solenoid 51, so that the slide switch 52 is made to bridge the contacts b and c and the level indicator 22 thus measures the strength of the signal $S_R$ from the line amplifier 19.

Each of the foregoing embodiments has been illustrated and described for a single channel audio system. However, it should be apparent that if the present invention is applied to a stereophonic system, the circuit as illustrated in either of FIG. 2 or 3 can be provided in each of the right and left channels thereof.

As described hereinabove, in the magnetic recording and playback apparatus according to the present invention, the level indicator 22 indicates the level of the signal $S_R$ to be recorded during recording, and can be selectively switched over during playback to indicate either the level of the power output signal $S_O$ to be applied to speakers or the level of the signal $S_P$ recorded on tape. Also, the magnetic recording and playback apparatus according to this invention includes circuitry to assure that when the stop mode is selected, the level that is indicated by the level indicator 22 is that of the output $S_O$ of the power amplifier 7.

Although several particular embodiments of this invention have been described in detail hereinabove with reference to the accompanying drawings, it is to be understood that the invention is not limited to those precise embodiments, and that various changes and modifications may be effected therein by persons skilled in the art without departing from the scope or spirit of the invention as defined in the appended claims.

What is claimed is:

1. Magnetic recording and playback apparatus selectively changeable between a recording mode, a playback mode, and a stop mode, comprising level indicator means for indicating the strength of a signal applied thereto and operative, when said apparatus is in the recording mode, to indicate the strength of a signal to be recorded; power amplifying means having an input coupled to receive a played back signal and an output providing an amplified output signal; and switching circuit means for automatically coupling said level indicator means to the output of said power amplifying means when either of said stop mode and said playback mode is selected, including manually actuable means operative when said apparatus is in the playback mode for selectively connecting said level indicator means to the input of said power amplifying means, whereby the level indicator means can be selectively set to monitor the strength of the played back signal at the input of said power amplifying means when said apparatus is in its playback mode but is automatically returned to monitor the level at the output of the power amplifying means whenever said stop mode or said playback mode is again selected.

2. Magnetic recording and playback apparatus according to claim 1, wherein said manually actuable means is operative only when said apparatus is in the playback mode.

3. Magnetic recording and playback apparatus according to claim 1, wherein said power amplifying means includes a power amplifier and an adjustable impedance between said input and said power amplifier for adjusting the output level of said amplified output signal.

4. Magnetic recording and playback apparatus selectively changeable between a recording mode, a playback mode, and a stop mode, comprising level indicator means for indicating the strength of a signal applied thereto and operative when said apparatus is in the recording mode to indicate the strength of a signal to be recorded; power amplifying means having an input coupled to receive a played back signal and an output providing an amplified output signal; and switching circuit means for coupling said level indicator means to the output of said power amplifying means whenever either of said stop mode and said playback mode is selected, including flip-flop circuit means settable into a first state whenever either of said playback mode and said stop mode is selected and settable into a second state when said recording mode is selected, and switching means in advance of said level indicator means and coupled to said flip-flop circuit means for connecting said level indicator means to said output and to said input of said power amplifying means when said flip-flop circuit means is in its first state and in its second state, respectively; and also comprising manually actuable means operative when said apparatus is in the playback mode for selectively connecting said level indicator means to the input of said power amplifying means including manually actuable switch means for selectively providing a switch signal and logic means coupled with said manually actuable switch means and with said flip-flop circuit means to permit said switch signal to change the state of said flip-flop circuit means only when said apparatus is in said playback mode.

5. Magnetic recording and playback apparatus selectively changeable between a recording mode, a playback mode, and a stop mode, comprising level indicator means for indicating the strength of a signal applied thereto and operative when said apparatus is in the recording mode to indicate the strength of a signal to be recorded; power amplifying means having an input coupled to receive a played back signal and an output providing an amplified output signal; and switching circuit means for coupling said level indicator means to the output of said power amplifying means whenever either of said stop mode and said playback mode is selected, including a plunger switch having a contact slide actuable between first and second positions in which the output and the input, respectively, of said power amplifying means are coupled to said level indicator means, and first and second solenoid means for actuating said contact slide to its first and second positions, respectively; first and second switching transistor means respectively coupled to said first and said solenoid means to energize the same when either of said stop mode and said playback mode is selected, and when said recording mode is selected, respectively; and manually actuable means, operative when said apparatus is in the playback mode, for selectively connecting said level indicator means to the input of said power amplifying means.

6. Magnetic recording and playback apparatus according to claim 5, wherein said manually actuable means includes means providing a voltage when said playback mode is selected, and a manually actuable switch coupled between such means and said second switching transistor means.

7. Magnetic recording and playback apparatus according to claim 5, wherein said manually actuable means is coupled to a control electrode of one of said switching transistor means to provide a switching voltage thereto.

8. Magnetic recording and playback apparatus having a recording mode, a playback mode, and a stop mode, comprising magnetic transducing means for magnetically recording a signal on a magnetic medium and picking up a recorded signal therefrom; line amplifier means coupled with said magnetic transducing means for amplifying the signal to be recorded when said apparatus is in said recording mode and for amplifying the picked-up recorded signal when said apparatus is in said playback mode, and having an output providing an amplified signal; output amplifier means having an input coupled to the output of said line amplifier means and an output providing an output signal; level indicator means for indicating the strength of a signal applied thereto; switching means for connecting the output of one of said line amplifier means and said output amplifier means to said level indicator means; and switch control means for controlling said switching means to automatically couple said level indicator means to the output of said output amplifier means when said apparatus is in said playback mode and when said apparatus is in said stop mode, and to automatically couple said level indicator means to the output of said line amplifier means when said apparatus is in said recording mode, and including manually actuable means for selectively causing said switching means to couple said level indicator means to the output of said line amplifier means when said apparatus is in said playback mode, whereby said level indicator means can be selectively set to monitor the strength of the picked-up recorded signal at the output of said line amplifier means when said apparatus is in its playback mode but is automatically returned to monitor the level at the output of said output amplifier means whenever said stop mode or said playback mode is again selected.

9. Magnetic recording and playback apparatus according to claim 8, wherein said manually actuable means is operative only when said apparatus is in said playback mode.

10. Magnetic recording and playback apparatus according to claim 8, wherein said line amplifier means includes means for adjusting the amplification thereof.

11. Magnetic recording and playback apparatus according to claim 10, further comprising input means coupled to the input of said line amplifier means for receiving an input signal, and wherein said means for adjusting includes a variable resistor disposed between said input means and the input of said said line amplifier means.

12. Magnetic recording and playback apparatus having a recording mode, a playback mode, and a stop mode, comprising magnetic transducing means for magnetically recording a signal on a magnetic medium and picking up a recorded signal therefrom; line amplifier means coupled with said magnetic transducing means for amplifying the signal to be recorded when said apparatus is in said recorded mode and for amplifying the picked-up recorded signal when said apparatus is in said playback mode, and having an output providing an amplified signal; output amplifier means having an input coupled to the output of said line amplifier means and an output providing an output signal; level indicator means for indicating the strength of a signal applied thereto; switching means for connecting the output of one of said line amplifier means and said output amplifier means to said level indicator means; and switch control means for controlling said switching means to couple said level indicator means to the output of said output amplifier means when said apparatus is in said playback mode and when said apparatus is in said stop mode, and to couple said level indicator means to the output of said line amplifier means when said apparatus is in said recording mode, wherein said switch control means includes flip-flop circuit means settable into a first state whenever said apparatus is in either of said playback mode and said stop mode and settable into a second state whenever said apparatus is in said recording mode; said switching means is coupled to said flip-flop circuit means to connect the output of said output amplifier means and the output of said line amplifier means, respectively, to said level indicator means, when said flip-flop circuit means is in its first state and in its second state; and manually actuable means for selectively causing said switching means to couple said level indicator means to the output of said line amplifier means when said apparatus is in said playback mode, including manually actuable switch means for selectively providing a switch signal and logic means coupled with said manually actuable switch means and with said flip-flop circuit means to permit said switch signal to change the state of said flip-flop circuit means only when said apparatus is in its playback mode.

13. Magnetic recording and playback apparatus having a recording mode, a playback mode, and a stop mode, comprising magnetic transducing means for magnetically recording a signal on a magnetic medium and picking up a recording signal therefrom; line amplifier means coupled with said magnetic transducing means for amplifying the signal to be recorded when said apparatus is in said recording mode and for amplifying the picked-up recorded signal when said apparatus is in said playback mode, and having an output providing an amplified signal; output amplifier means having an input coupled to the output of said line amplifier means and an output providing an output signal; level indicator means for indicating the strength of a signal applied thereto; switching means for connecting the output of one of said line amplifier means and said output amplifier means to said level indicator means wherein said switching means includes a plunger switch having a contact slide actuable between first and second positions in which the respective outputs of said output amplifier means and said line amplifier means are coupled to said level indicator means, and first and second solenoid means for actuating said contact slide to its first and second positions, respectively; and switch control means for controlling said switching means to couple said level indicator means to the output of said output amplifier means when said apparatus is in said playback mode and when said apparatus is in said stop mode, and to couple said level indicator means to the output of said line amplifier means when said apparatus is in said recording mode, wherein said switch control means includes first and second switching transistor means respectively coupled to said first and second solenoid means to energize the same when either of said stop mode and said playback mode is selected, and when said recording mode is selected, and also includes manually actuable means for selectively causing said switching means to couple said level indicator means to the output of said line amplifier means when said apparatus is in said playback mode.

14. Magnetic recording and playback apparatus according to claim 13, wherein said manually actuable means includes means providing a voltage when said playback mode is selected, and a manually actuable switch coupled between such means and said second switching transistor.

* * * * *